2,079,197

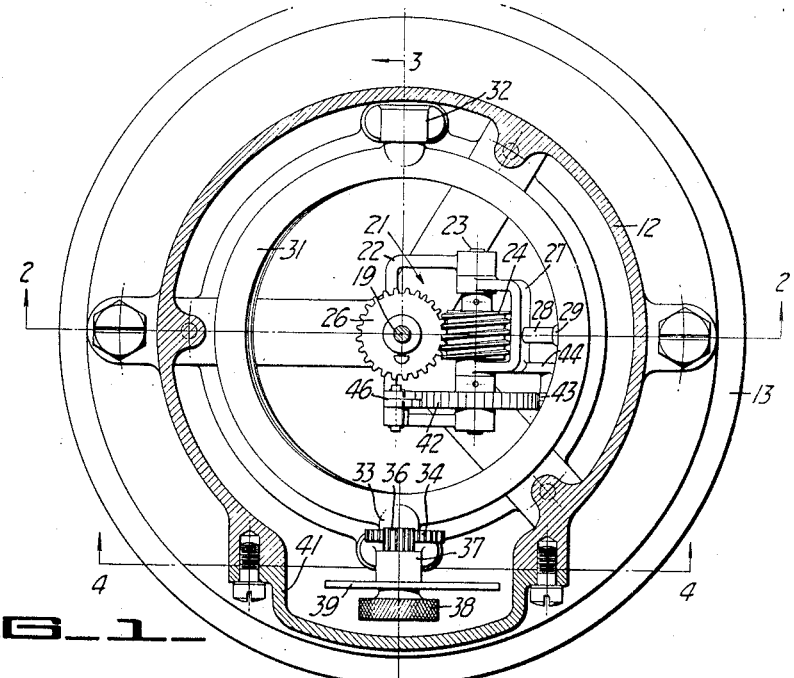
FIG_1_
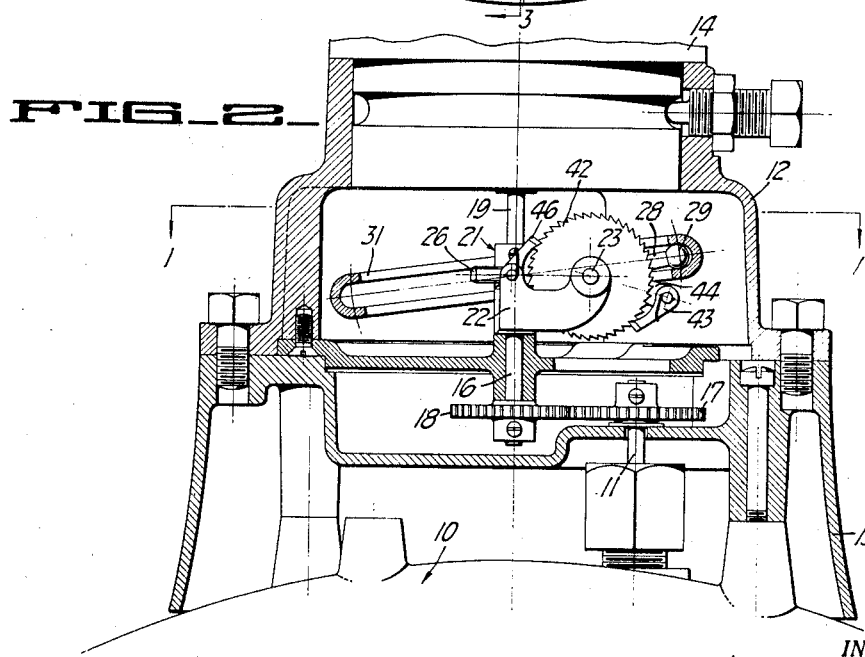
FIG_2_
INVENTOR.
Charles P. Bergman
BY Paul D. Flehr
ATTORNEY

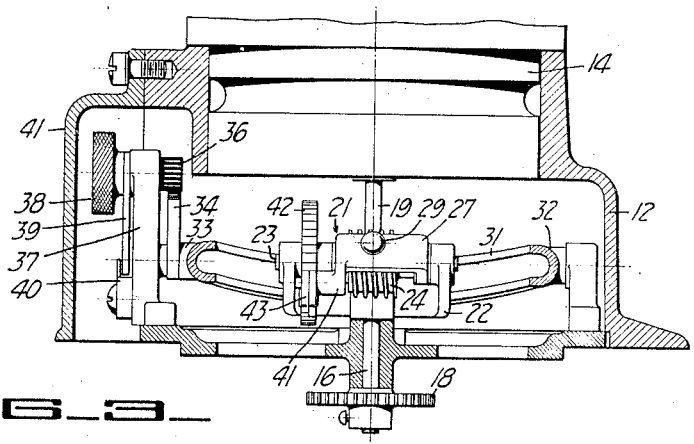
FIG_3_
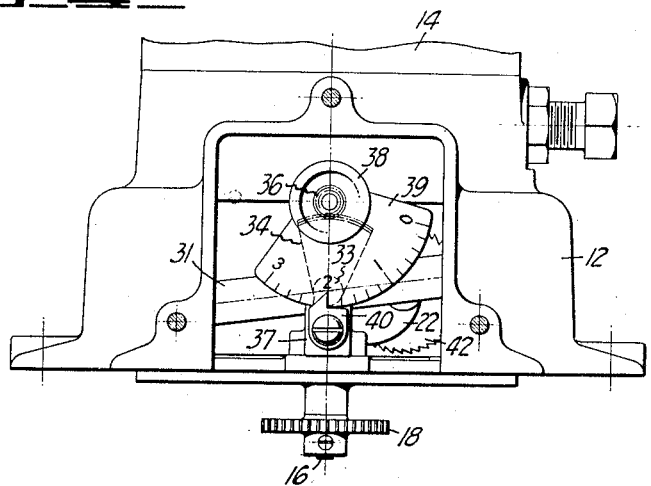
FIG_4_
INVENTOR.
Charles P. Bergman
BY Paul D. Flehr
ATTORNEY May 4, 1937.    C. P. BERGMAN    2,079,197
ACCURACY REGULATOR
Filed July 11, 1934    3 Sheets-Sheet 3
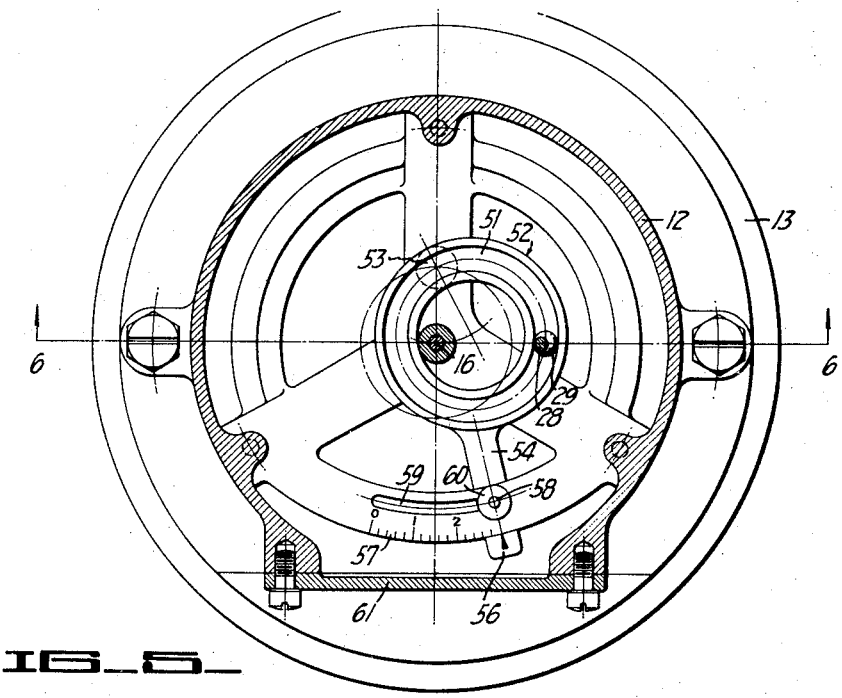
FIG_5_
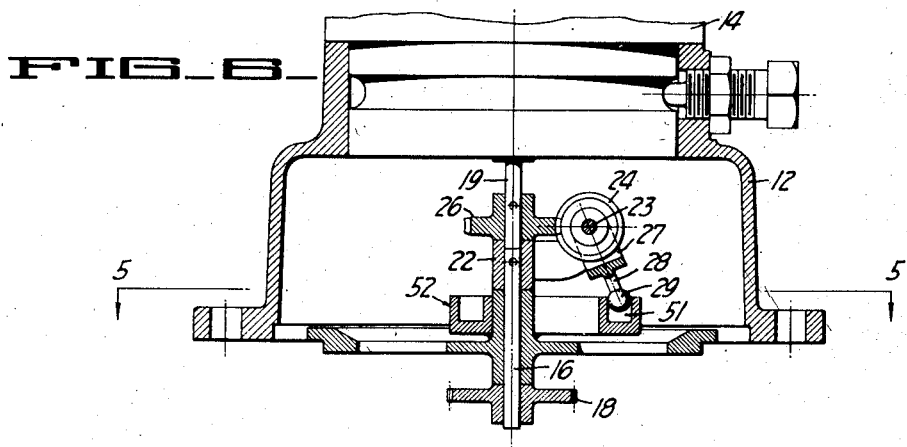
FIG_6_
INVENTOR.
Charles P. Bergman
BY Paul D. Flehr
ATTORNEY Patented May 4, 1937

UNITED STATES PATENT OFFICE 2,079,197

ACCURACY REGULATOR

Charles P. Bergman, San Francisco, Calif., assignor, by mesne assignments, to Reconstruction Finance Corporation, New York, N. Y., a corporation of the United States Application July 11, 1934, Serial No. 734,626

10 Claims. (Cl. 73—233)

This invention relates generally to apparatus in which registers are utilized to effect various measurements. More particularly, it applies to fluid meters which employ registers to measure liquid flow.

In many instances it is desirable to provide meters having a high degree of accuracy, as for example in measuring flow of oil or gasoline. It is a known characteristic of all meters of the displacement type, that a range of inaccuracy is afforded which must be taken into account in making factory adjustments, and which may also necessitate adjustments after operation if precision measurement is desired. In the past, regulations have been made by the use of an adjustable by-pass about the meter, by adjusting the stroke or displacement ratio of the meter, or by replacing one or more of the gears in the gear train between the meter shaft and the register.

Adjustable by-passes are not satisfactory in meter practice, because a meter so equipped will not afford accuracy over a range of different pressures or flow rates. Adjustments of the stroke or displacement ratio of the meter are difficult to make with a high degree of accuracy, and furthermore, such methods of adjustment are difficult if not impossible to apply to meters utilizing gyrating or rotating pistons. Replacement of one or more elements of the gear train to the register can be carried out in the factory, but under field conditions such changes are impracticable and virtually prohibitive. Furthermore, this method of adjustment accomplishes results by trial of error and in general is available only for relatively large changes in the speed ratio. In a typical instance the error due to imperfections in design and manufacture or to imperfect adaptation to different fluids or different operating conditions, may cover a range of 2% of the indicated measurement. Since specifications for meters frequently call for accuracy within 0.1% or less, it is evident that a precise means of adjustment within such range of inaccuracy is highly desirable. It is therefore an object of this invention to provide an accurate means for effecting regulation in conjunction with a register, whereby precise adjustments can be made, either in the factory or under field conditions, without the disadvantages outlined above in connection with prior expedients.

More specifically, it is an object of the invention to provide an accuracy regulator for a meter, which can be incorporated without radical alteration in present meter designs, and which will be characterized by simplicity of construction and reliability of operation.

Another object of the invention is to provide an accuracy regulator which, in the event it should become inoperative, will not cause the meter to be more inaccurate than if the mechanism were not employed.

Further objects of the invention will appear from the following description in which the preferred embodiments of the invention have been set forth in detail in conjunction with the accompanying drawings.

Fig. 1 is a cross-sectional view taken along the line 1—1 of Fig. 2, and showing a fluid meter equipped with an accuracy regulator in accordance with the present invention.

Fig. 2 is a cross-sectional detail taken along the line 2—2 of Fig. 1.

Fig. 3 is a cross-sectional detail taken along the line 3—3 of Fig. 1.

Fig. 4 is a cross-sectional detail taken along the line 4—4 of Fig. 1.

Fig. 5 is a view similar to Fig. 1 but showing modified means for effecting the desired adjustment of the accuracy regulator.

Fig. 6 is a cross-sectional detail taken along the line 6—6 of Fig. 5.

Referring first to Figs. 1 to 4 inclusive, I have shown the invention incorporated with a fluid meter 10 of the displacement type, which has a shaft 11 driven by the moving pistons or like parts of the meter. Shaft 11 extends into a casing formed by the upper and lower parts 12 and 13, the upper part retaining the removable counting register unit 14. The shaft 11 is aligned with and serves to drive a second shaft 16, through the gears 17 and 18. Shaft 19 is a part of the unit 14 and serves to operate the register mechanism. In typical prior meter constructions, shafts 16 and 19 form one continuous shaft for the direct operation of the register. In utilizing my invention, shafts 16 and 19 are coupled together by the accuracy regulating mechanism 21, the details of which will now be explained.

The accuracy regulating means illustrated in Figs. 1 to 4 inclusive, is constructed as follows:— Mounted upon the shaft 16 and extending laterally therefrom there is an arm or bracket 22. Journaled within this bracket there is a shaft 23 which is in a plane normal to the line of centers of shafts 16 and 19. Fixed upon shaft 23 there is a worm 24 which meshes with a worm gear 26, this latter gear being fixed to the register shaft 19.

It will be evident from the above that when worm 24 is stationary with respect to bracket 22, it effectively locks bracket 22 to the worm gear 26, so that shafts 16 and 19 must rotate in unison. This locking together of shafts 16 and 19 is positive in both directions, and it is impossible for register shaft 19 to either lag behind or to "coast" ahead of shaft 16 under the influence of inertia. Likewise, it is apparent that if worm 24 is rotated a certain amount relative to bracket 22, the angular relationship between shafts 16 and 19 will be shifted a certain amount. Therefore, if for each revolution of shaft 16 worm 24 is rotated a given amount in one direction relative to the bracket, shafts 16 and 19 will no longer be driven in unison, but a differential rate of rotation will exist, depending upon the average rate of rotation of the worm. Rotation of worm 24 relative to bracket 22 can therefore be termed rotation superimposed upon the means or mechanism serving to interconnect shafts 16 and 19.

In order to effect individual rotation of worm 24 in response to rotation of shaft 16, and in order to afford an accurate means for adjusting the amount of such rotation, I preferably employ a member to which reciprocating or oscillatory movement is applied. Thus, journaled to shaft 23 there is a yoke 27 carrying an arm 28. The end 29 of this arm may be spherical shaped, as shown, and operates within an orbit ring 31. This orbit ring is mounted in such a manner that its inclination with respect to a plane normal to the line of centers of shafts 16 and 19 can be adjusted. Thus, it is shown supported within the casing part 12 by the journals 32 and 33. Adjacent the journal 33 the ring carries a segmental gear 34 which is engaged by pinion 36. The shaft which carries pinion 36 is journaled to the plate 37, and also carries a manual operating knob 38. Rotating together with pinion 36 and knob 38 there is a segmental dial 39 which may be graduated to indicate the inclination of the orbit ring 31 and which may be read in conjunction with a pointer 40. Access to knob 38 to effect adjustment can be had by removing the casing closure 41.

In order that oscillating movement of arm 28 may impart rotary movement to the worm 24, I preferably employ a ratcheting mechanism which may be constructed as follows:—Fixed to the shaft 23 there is a ratchet wheel 42, the teeth of which are adapted to be engaged by a pair of spring-pressed pawls 43. These pawls are pivotally carried by an arm 44, which in turn is fixed to the yoke 27. Backward movement of ratchet wheel 42 is prevented by a pair of spring-pressed pawls 46, which are mounted upon bracket 22. The biting faces of these pawls are staggered a distance apart equal to one-half of the distance between adjacent ratchet teeth. This expedient is for the sake of accuracy, and it is obvious that single pawls may be employed if desired, provided teeth of sufficiently small size are provided upon the wheel 42.

Operation of the apparatus described above can now be reviewed as follows:—Assuming first that the orbit ring 31 is positioned in a plane normal to the line of centers between shafts 16 and 19, it is evident that as shaft 16 rotates, arm 28 will traverse the orbit ring but it will not be oscillated with respect to the bracket 22. Therefore, worm 24 will remain stationary with respect to the bracket 22, and the shafts 16 and 19 will be locked together to rotate in unison. If the knob 38 is adjusted to position the orbit ring 31 at an inclination such as shown in Fig. 2, it is evident that rotation of shaft 16 will be accompanied by oscillating movement of arm 28, and that for each cycle of oscillation of this arm ratchet wheel 42 and worm 24 will be rotated a given angular amount. Since, as has been previously explained, rotation of worm 24 relative to bracket 22 tends to change the angularity or phase relationship between shafts 16 and 19, it is evident that these shafts will no longer be driven in unison. On the average, however, a definite speed ratio will be established between shafts 16 and 19, and the value of this ratio will be dependent upon the amount of angular advancement of worm 24 for each revolution of shaft 16. The maximum range of variation of the speed ratio will be from a position of orbit ring 31 in which its plane is normal to the line of centers of shafts 16 and 19, to a position of maximum inclination of the orbit ring. Between such limits the speed ratio can be varied by relatively small steps, dependent upon the setting of knob 38.

In manufacturing and assembling a meter equipped with my invention, the gear train of the register unit 14 is such as to afford theoretical accuracy for a setting of knob 38 substantially midway between its limits of adjustment. If, under field conditions, or under test conditions simulating the conditions under which the meter is to be operated, an inaccuracy is found, adjustments of knob 38 can be made in accordance with the amount of the inaccuracy, to effect substantially complete correction.

In the particular assembly illustrated in the drawings, oscillation of arm 28 serves to rotate ratchet wheel 42 in a clockwise direction, as viewed in Fig. 2, so that rotation of worm 24 tends to advance the shaft 19 with respect to shaft 16. It is obvious, however, that with a reversal of parts, as for example reversing the pawls and the teeth of ratchet wheel 42, rotation of worm 24 may be caused to retard shaft 19 with respect to shaft 16. In such event, the principle of operation will be the same, except that the gear train for register 14 must be properly selected so that the range of adjustment afforded will be ample to compensate over the range of inaccuracy to which the meter may be subject.

In Figs. 5 and 6, I have shown simplified means for adjustably oscillating arm 28. In this case, the end 29 of arm 28 engages within a circular groove 51, which is formed within an annular cam member 52. One side of the cam member 52 is pivotally carried by a fixed support, as indicated by pin 53, and extending from the other side there is an adjusting arm 54. The outer end of arm 54 carries a pointer 56, which co-operates with a graduated scale 57. In order to releasably clamp the arm 54 in a desired adjusted position, I have indicated suitable means, such as a bolt 58 which extends through arcuate slot 59 and which can be tightened or released by the thumb nut 60. Access to the arm 54 and the scale 57 can be had by removing the casing closure 61. It is evident that upon shifting the position of arm 54, the position of the cam member 52 will be varied from one limiting position in which it has maximum eccentricity with respect to the line of centers of shafts 16 and 19, to a position in which the groove 51 is substantially concentric with respect to the aforesaid line of centers. Likewise, it is apparent that the amplitude of oscillating movement imparted to arm 28 is dependent upon the degree of eccentricity of the cam member which, as just explained, is dependent upon the setting of arm 54.

It will be noted that the accuracy regulating mechanism is itself housed within a generally annular casing having an open bottom end adapted to mate with the top of the meter body, and an open top end adapted to mate with the bottom of a register, while vertical input and output shafts are arranged in alignment with one another and concentrically with the generally annular casing. This general arrangement is most convenient, in that the assembly of meter, accuracy regulator, and register may be made a relatively compact one, the parts being retained in their normal relation, except for the fact that the register is elevated somewhat higher above the meter than is usually the case, in order to make room to receive the casing of the regulator.

It will be evident that my invention affords a simple means to enable precise adjustments either at the factory or in the field. Because of the positive nature of the adjustment afforded, it is possible to make predetermined corrections with reference to the scale afforded, without resorting to methods of trial and error. Thus, if the percentage error under given conditions is known, a single adjustment can be made for effecting substantially complete correction, since the scale divisions have a definite relationship with the percentage of correction. A high degree of reliability is afforded, and in the event the ratcheting mechanism should become inoperative, the meter continues to operate the register substantially the same as if the regulator were not provided.

I claim:

1. An accuracy regulator for forming an operative drive connection between the rotating shaft of a fluid meter and the aligned rotatable shaft of a register, where the meter has a range of inaccuracy for which correction is desired, an arm secured to one of the shafts, means including a rotatable gear carried by the arm, said last means serving to form a continuous motion-transmitting positive connection between the arm and the other shaft, the gear, when stationary with respect to the arm, serving to lock the shafts together for unison rotation, a single oscillatable member pivotally carried by the arm, ratcheting means for positively converting oscillating movement of said member to rotating movement of the gear, means for applying oscillating movement to said member in response to rotation of the meter shaft, and fixedly adjustable means including a cooperating scale and pointer for varying the amplitude of said oscillating movement.

2. An accuracy regulator for forming an operative drive connection between the rotating shaft of a fluid meter and the aligned rotatable shaft of a register, where the meter has a range of inaccuracy for which correction is desired, an arm secured to the meter shaft, a single worm rotatably carried by said arm on an axis normal to the axes of both said shafts, a worm gear secured to the register shaft and operably engaged with the worm, a ratchet wheel carried by the arm and rotatable together with the worm, an oscillating lever pivotally carried by the arm, pawl elements carried by the lever and serving to engage the ratchet wheel for positive drive thereof, movable cam means serving to oscillate the lever as the meter shaft and said arm are rotated, said arm, together with said pawls, ratchet wheel, worm and worm gear, constituting the sole means for interposing angular increments of rotation between the meter shaft and the register shaft to vary the speed ratio between said shafts by predetermined increments, and fixedly adjustable means including a scale and cooperating pointer for determining the position of the cam means and consequently the stroke of the oscillatable lever produced thereby.

3. An accuracy regulator for forming an operative drive connection between the rotating shaft of a meter and a register, where the meter has a range of inaccuracy for which correction is desired, comprising a generally annular casing having an open bottom end adapted to mate with the top of a meter body and an open top end adapted to mate with the bottom of a register, vertical input and output shafts arranged in alignment with one another, a frame on said input shaft carrying a worm rotatable on an axis extending transversely of said shafts and displaced sidewardly therefrom, a gear on said output shaft meshing with said worm, a ratchet wheel secured to said worm, means oscillatable about the axis of the worm and carrying one or more pawls engaging the ratchet wheel for positive movement thereof, a grooved ring movably disposed within said casing, an arm connected to the pawl carrying means, the end of the aforesaid arm being received in the aforesaid groove of the ring, adjustment means for adjusting the position of the ring in the casing, means to lock the same in fixed position, and a removable plate at the side of the aforesaid casing adjacent said adjustment and lock means in order to afford access to the same.

4. An accuracy regulator for forming an operative drive connection between the rotating shaft of a meter and a register, where the meter has a range of inaccuracy for which correction is desired, comprising input and output shafts arranged in alignment with one another, a frame on said input shaft carrying a worm rotatable on an axis extending transversely of said shafts and displaced sidewardly therefrom, a gear on said output shaft meshing with said worm, a ratchet wheel connected to said worm, means oscillatable about the axis of the worm and carrying one or more pawls engaging the ratchet wheel for positive movement thereof, an internally grooved ring oscillatable about horizontal trunnions at diametrically opposed points on the ring, said ring being concentric with the aforesaid shafts, an outwardly projecting arm connected to the pawl carrying means, the end of the aforesaid arm being received in the aforesaid groove of the ring, adjustment means including a cooperating pointer and scale normally fixedly related, and reduction gearing between said adjustment means and said ring for gradual accurate adjustment of the angular position of the ring on its trunnions.

5. An accuracy regulator for forming an operative drive connection between the rotating shaft of a meter and a register, where the meter has a range of inaccuracy for which correction is desired, comprising a casing having an open bottom end adapted to mate with the top of a meter body and an open top end adapted to mate with the bottom of a register, vertical input and output shafts arranged in alignment with one another, a frame on said input shaft carrying a worm rotatable on an axis extending transversely of said shafts and displaced sidewardly therefrom, a gear on said output shaft meshing with said worm, a ratchet wheel connected to said worm, means carrying one or more pawls engaging the ratchet wheel for positive movement thereof, a grooved ring disposed within said casing and oscillatable about horizontal trunnions at diametrically opposed points on the ring, said ring being concentric with the aforesaid shafts, an outwardly projecting arm connected to the pawl carrying means, the end of the aforesaid arm being received in the aforesaid groove of the ring, adjustment means including a cooperating pointer and scale normally fixedly related, and reduction gearing between said adjustment means and said ring for gradual accurate adjustment of the angular position of the ring on its trunnions.

6. An accuracy regulator for forming an operative drive connection between the rotating shaft of a meter and a register, where the meter has a range of inaccuracy for which correction is desired, comprising a generally annular casing having an open bottom end adapted to mate with the top of a meter body and an open top end adapted to mate with the bottom of a register, vertical input and output shafts arranged in alignment with one another approximately coaxially with the casing, a frame on said input shaft carrying a worm rotatable on an axis extending transversely of said shafts and displaced sidewardly therefrom, a gear on said output shaft meshing with said worm, a ratchet wheel connected to said worm, means carrying one or more pawls engaging the ratchet wheel for positive movement thereof, an internally grooved ring disposed within said casing and oscillatable about horizontal trunnions at diametrically opposed points on the ring, said ring being concentric with the aforesaid shafts, an outwardly projecting arm connected to the pawl carrying means, the end of the aforesaid arm being received in the aforesaid groove of the ring, adjustment means including a cooperating pointer and scale for fixedly adjusting the angular position of the ring on its trunnions, and a removable plate at the side of the aforesaid casing adjacent said adjustment means in order to afford access to the same.

7. An accuracy regulator for forming an operative drive connection between the rotating shaft of a meter and a register, where the meter has a range of inaccuracy for which correction is desired, comprising a generally annular casing having an open bottom end adapted to mate with the top of a meter body and an open top end adapted to mate with the bottom of a register, vertical input and output shafts arranged in alignment with one another, a frame on said input shaft carrying a worm rotatable on an axis extending transversely of said shafts and displaced sidewardly therefrom, a gear on said output shaft meshing with said worm, a ratchet wheel connected to said worm, means carrying one or more pawls engaging the ratchet wheel for positive movement thereof, a grooved ring movably disposed within said casing, an arm connected to the pawl carrying means, the aforesaid arm cooperating with the aforesaid grooved ring, adjustment means for gradual accurate adjustment of the position of the grooved ring in the casing, and means to lock the adjustment means in order to hold the grooved ring in adjusted position.

8. An accuracy regulator for forming an operative drive connection between the rotating shaft of a meter and a register where the meter has a range of inaccuracy for which correction is desired, comprising input and output shafts arranged in alignment with one another, a frame on said input shaft carrying a worm rotatable on an axis extending transversely of said shafts and displaced sidewardly therefrom, a gear on said output shaft meshing with said worm, a ratchet wheel connected to said worm, means oscillatable about the axis of the worm and carrying one or more pawls engaging the ratchet wheel for positive movement thereof, an internally grooved ring oscillatable about horizontal trunnions at diametrically opposed points on the ring, said ring being concentric with the aforesaid shafts, an outwardly projecting arm connected to the pawl carrying means, the end of the aforesaid arm being received in the aforesaid groove of the ring, and adjustment means including a manually movable control element and reduction gearing between the control element and the ring for gradual accurate adjustment of the angular position of the ring on its trunnions.

9. An accuracy regulator for forming an operative drive connection between the rotating shaft of a fluid meter and the aligned rotatable shaft of a register, where the meter has a range of inaccuracy for which correction is desired, an arm secured to one of the shafts, means including a rotatable gear carried by the arm, said last means serving to form a continuous motion-transmitting positive connection between the arm and the other shaft, the gear, when stationary with respect to the arm, serving to lock the shafts together for unison rotation, a single oscillatable member pivotally carried by the arm, ratcheting means for positively converting oscillating movement of said member to rotating movement of the gear, means for applying oscillating movement to said member in response to rotation of the meter shaft, fixedly adjustable means including a cooperating scale and pointer for varying the amplitude of said oscillating movement, and means to lock the adjustable means in fixed position.

10. An accuracy regulator for forming an operative drive connection between the rotating shaft of a fluid meter and the aligned rotatable shaft of a register, where the meter has a range of inaccuracy for which correction is desired, an arm secured to the meter shaft, a single worm rotatably carried by said arm on an axis normal to the axes of both said shafts, a worm gear secured to the register shaft and operably engaged with the worm, a ratchet wheel carried by the arm and rotatable together with the worm, an oscillating lever pivotally carried by the arm, pawl elements carried by the lever and serving to engage the ratchet wheel for positive drive thereof, movable cam means serving to oscillate the lever as the meter shaft and said arm are rotated, said arm, together with said pawls, ratchet wheel, worm and worm gear, constituting the sole means for interposing angular increments of rotation between the meter shaft and the register shaft to vary the speed ratio between said shafts by predetermined increments, fixedly adjustable means including a scale and cooperating pointer for determining the position of the cam means and consequently the stroke of the oscillatable lever produced thereby, and means to lock the adjustable means in fixed position.

CHARLES P. BERGMAN.